United States Patent [19]
Pollard

[11] 4,411,443
[45] Oct. 25, 1983

[54] STREAMLINED BICYCLE DESIGN

[76] Inventor: Christopher A. Pollard, 1060 S. Park Dr., Monument, Colo. 80132

[21] Appl. No.: 159,214

[22] Filed: Jun. 13, 1980

[51] Int. Cl.$^3$ .............................................. B62K 3/00
[52] U.S. Cl. ............................ 280/281 LP; 296/1 S; 280/281 B
[58] Field of Search ............ 280/259, 281 LP, 281 B; 296/78.1, 1 S; D12/107, 110, 114, 126

[56] References Cited

U.S. PATENT DOCUMENTS

| | | | |
|---|---|---|---|
| 1,135,337 | 4/1915 | Bunau-Varilla | 296/78.1 |
| 1,648,505 | 11/1927 | Persu | 296/1 S |
| 2,147,732 | 2/1939 | Boynton | 280/261 |
| 3,760,905 | 9/1973 | Dower | 280/233 X |
| 3,834,734 | 9/1974 | Chiappettl | 280/261 |
| 3,854,754 | 12/1974 | Jabonski | 280/242 R |

FOREIGN PATENT DOCUMENTS

| | | | |
|---|---|---|---|
| 1112848 | 3/1956 | France | 296/1 S |
| 478037 | 2/1953 | Italy | 296/78.1 |
| 790339 | 2/1958 | United Kingdom | 280/281 LP |

OTHER PUBLICATIONS

"Human Power", Summer, Fall, 1979, pp. 1 to 7.
"Popular Science", Oct. 1980, p. 86.
"Kreidler Florett" sales brochure, 4 pages, 3-10-66.
"Bicycling", Aug. 1981, (4 pages unknown), Article by Schubert.
Fujikawa et al., Bicycling, pp. 55-56 (Nov. 1977) Streamlining: Designing for Speed.
Beauvais et al., Society of Automotive Engineers, Report No. 680121, pp. 451 to 462-(Problems of Ground Simulation in Automotive Aerodynamics), 1968.
B. Althaus, Wind Tunnel Measurements on Bodies and Wind-Body Combinations, pp. 159 to 178, Institu fur Aerodynamik and Gasdynamik der Universitat Stuttgart, 1975.
Carmichael, 2nd International Symposium on Technology and Science of Low Speed and Motorless Flight, Application of Sailplane and Low Drag Underwater Vehicle Technology to the Long-Endurance Drone Problem, pp. 159 to 178, Sep. 1974.
Morelli et al., Automotive Engineering Congress and Exposition, Detroit, Mich., Feb. 23-27, 1976, Society of Automotive Engineers Report No. 760186, 10 pages.
"Bike-Tech.", vol. 1, 1982, pp. 1, 4-6.
"The First Human Powered Vehicle Scientific Symposium Proceedings", 1982, pp. 29-36 and 163-164.
"The 8th International Human Powered Speed Championships", Oct. 1982; (15 page document).

*Primary Examiner*—Joseph Paul Brust
*Attorney, Agent, or Firm*—Lee & Hollander

[57] ABSTRACT

The invention includes a low-drag cycle having an elongated frame extending between a smaller front wheel and a larger rear wheel. A cyclist assumes a recumbant position over the frame facing down. A cycle is steered by means of the front wheel, while the cyclist powers the cycle by means of a pedal arrangement driving the larger rear wheel. A streamlined, pod-shaped body which is symmetrical about an axis parallel to the direction of travel achieves a very low coefficient of drag and maximizes laminar flow to further reduce drag. The cycle wheels are contained within two streamlined fairings which extend from the streamlined cycle body to near the ground, the area between wheels being left open to increase the lateral stability of the cycle and to allow the rider to straddle the frame so that both feet may be placed on the ground while starting or stopping the cycle. Once sufficient speed is attained to ensure stability, hinged doors in the streamlined body automatically close as the cyclist returns both feet to the pedals.

9 Claims, 8 Drawing Figures

STREAMLINED BICYCLE DESIGN

FIELD OF THE INVENTION

This invention is related to human powered vehicles, and more particularly to streamlined cycle type vehicles.

BACKGROUND OF THE INVENTION

Since the invention of the bicycle in the early 1800's, much effort has been devoted to the attainment of high speeds and high efficiencies on bicycles and other, similar human powered devices. With increasing shortages of energy, there has recently been a great revival of interest in human powered vehicles, particularly bicycles, and much work has been put in developing bicycles which can attain higher speeds and/or require less energy from a rider to propel.

The resistance which a bicycle rider must overcome includes rolling resistance of the bicycle and the wind resistance, or drag, of the bicycle and rider. Of these two factors, wind resistance is the dominating factor at higher speeds.

The wind resistance, or drag of a cycle may be characterized by a drag coefficient, $C_d$ which is defined as:

$$C_d = \frac{2F}{pV^2A}$$

where F is the drag or aerodynamic force on the cycle, V is the velocity of the cycle, p is the air density, and A is a reference area determined by the area of the frontal projection of the cycle. A conventional bicycle and rider have a frontal area of approximately 4.5 square feet, and the drag coefficient, $C_d$, is approximately 1. This limits the top speed attainable by such a bicycle to approximately 30 mph over moderate distances on flat surfaces with no tail wind. As a basis for comparison, a typical automobile would have a drag coefficient of about 0.4, while some glider fuselages have drag coefficients as low as 0.034.

In an effort to reduce wind resistance and attain higher speeds, many different designs for low-drag bicycles have been developed. These designs include streamlined fairings and fully-enclosed bodies for conventional two-wheeled bicycles. To reduce frontal area and hence wind resistance, other cycle designs have been developed in which the cyclist is in a recumbant position. This allows the cycle and cyclist to be enclosed by a streamlined body of much lower frontal area.

Wind tunnel testing has been carried out in order to determine the optimum shape of a streamlined cycle. One article which describes such testing is "Streamlining: Designing for Speed" by Fujikawa and Olsen, in the November, 1977 issue of *Bicycling*. In wind tunnel tests such as those described in this reference, the cycle model is typically mounted on a fixed horizontal surface, simulating the road or other surface on which the cycle is driven. When using such a testing procedure, there is no relative motion between the cycle and the floor; and the air stream thus moves past both the model and the "ground" at the same speed. This is different from the actual situation when a cycle is being ridden in which there is no relative motion between the air and ground, and a cycle moves through the air and over the ground at the same speed, neglecting the effects of wind.

Although it would at first appear simple to conduct wind tunnel simulations with a moving ground surface to approximate the actual operating conditions, this is not the case. Such tests require much more complicated equipment. Additionally, studies of automotive aerodynamics indicate that wind tunnel experiments with moving ground planes are not necessarily more accurate than those with stationary ground planes. In one study described in "Problems of Ground Simulation in Automotive Aerodynamics," by F. N. Beauvais, published by the Society of Automotive Engineers, Report No. 680121, the aerodynamic coefficients predicted with a moving ground plane simulating actual conditions were significantly less accurate than those predicted with a fixed ground plane. Thus little, if any, wind-tunnel testing of low-drag cycle designs has been done under realistic conditions.

A bicycle of practical design is constrained to have the bulk of its body within a few feet of the ground. Additionally, the wheels of the cycle extending to the ground contribute significantly to the aerodynamic drag. It is therefore not surprising that wind tunnel tests using stationary ground surfaces predict that a minimum drag configuration occurs where there is little or no gap between the cycle body and the ground. The most successful streamlined cycles, evaluated in terms of maximum attainable speed, have adopted such a configuration, and these cycles typically have a shape which includes a streamlined, rounded top with vertical walls which extend very near to the ground. Several such streamlined bodies are shown and described in the Summer, 1979, issue of *Human Power*, including the first human-powered vehicle to exceed 55 mph.

The drag coefficient predicted by such wind tunnel simulations is often much different from the actual drag coefficient achieved by a cycle; and although current streamlined cycle bodies have achieved higher speeds and efficiencies then previous designs, they have still fallen far short of their maximum theoretical performance, due, at least in part, to the above-described difference between actual conditions and the conditions of most wind tunnel simulations. In one typical design, the drag coefficient predicted by wind tunnel testing on a stationary surface was approximately 0.07. Under operating conditions with the full-size cycle, however, the actual drag coefficient was calculated to be approximately 0.2.

In addition to the aerodynamic factors mentioned above, there are many other practical conditions which must be taken into account in designing an efficient, low-drag cycle. First, the cycle body must be able to enclose the cyclist, and the position of the cyclist should be one which is reasonably comfortable and which is conducive to sustained exertion as the cyclist propels the cycle. The cyclist's position and the cycle body design should also be such that the cyclist has good vision both forward and sideways when riding the cycle.

Additionally, a practical cycle requires that a cyclist have quick and ready access to the ground with both feet in order that the cycle may be easily started and stopped. Some high speed cycles have been designed which provide low speed stability by using two wheels to provide stability in the manner of a tricycle. These cycles are impractical for every day transportation use, however, since the ability to lean into a turn is necessary to negotiate all but the most gentle of curves, especially at high speeds. A conventional two-wheeled cycle, on the other hand, is able to negotiate sharp turns at relatively high speeds without difficulty, since a cyclist is able to counteract centrifugal force by leaning into the turn. The ability to lean into a turn also requires that the ground clearance of the streamlined body be such that it does not touch the ground when the cycle is leaned or tilted sideways at angles of 20 or 30 degrees, which are commonly encountered when negotiating turns.

Finally, the cycle should present a small sideways profile so that strong side winds do not overly affect the stability of the bicycle. Also, the cycle streamlined body should be designed such that it may be fabricated with reasonable economy and should be capable of achieving high strength with light weight.

In the present invention, each of the above-stated problems have been solved in a novel and practical manner to provide an efficient and practical human-powered vehicle capable of achieving relatively high speeds.

SUMMARY OF THE PRESENT INVENTION

The present invention provides a novel low-drag cycle having a frame and body which achieve a very low drag while overcoming the aforementioned disadvantages of previous streamlined cycles. In the present invention, an elongated frame extends between a smaller front wheel and a larger rear wheel. A cyclist assumes a recumbant position over the frame facing down. The cycle is steered by means of the front wheel, while the cyclist powers the cycle by means of a pedal arrangement driving the larger rear wheel.

A streamlined, pod-shaped body is provided which is symmetrical about an axis parallel to the direction of travel. The streamlined body achieves a very low coefficient of drag and maximizes laminar flow to further reduce drag. The cycle wheels are contained within two streamlined fairings which extend from the streamlined cycle body to near the ground. By separately enclosing each wheel, the area between wheels is left open, increasing the lateral stability of the cycle. This design also allows the rider to straddle the frame so that both feet may be placed on the ground while starting or stopping the cycle in a manner similar to that of a conventional bicycle. Once sufficient speed is attained to ensure stability, hinged doors in the streamlined body automatically close as the cyclist returns both feet to the pedals.

DESCRIPTION OF THE DRAWINGS

The features and advantages of the present invention will become more clear upon reading the following Description of the Preferred Embodiment in conjunction with the accompanying drawings, of which.

DESCRIPTION OF THE PREFERRED EMBODIMENT

Figure 1:
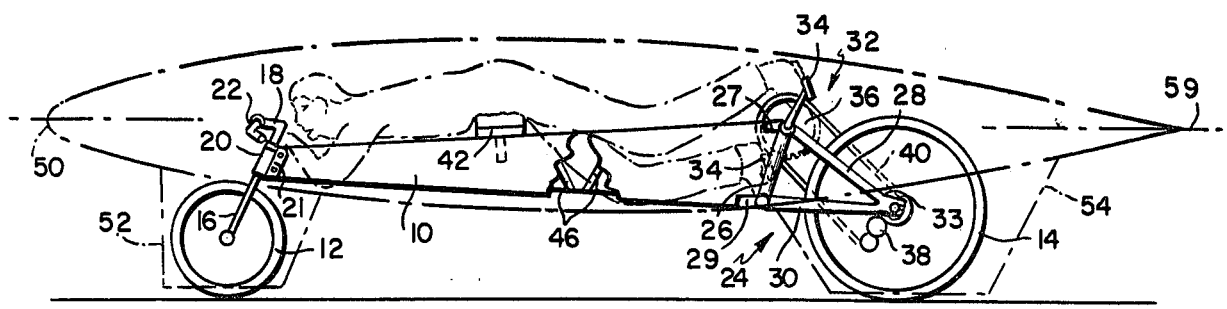
FIG. 1 shows the mechanical arrangement of the cycle.

Referring to FIG. 1, there is shown a drawing of the preferred embodiment of the present invention which illustrates the mechanical arrangement of the cycle. The structural components of the bicycle include a frame 10 located between the smaller front wheel assembly 31 and a larger rear wheel assembly 32. The bicycle is steered by the smaller front wheel 12. The wheel is conventionally mounted by means of front forks 16 which are attached to a steering post 18. Steering post 18 is pivotably mounted in ball bearings within a sleeve member 20. Sleeve member 20 is bolted or otherwise attached to frame 10 by means of U-shaped bracket 21. The cycle is steered by handle bars 22 attached to steering post 18. Handle bars 20 are short and relatively straight to allow for steering within the cycle body 50, described in detail below. Gear shift and brake controls (not shown) are mounted on the handle bars. Front wheel 12 is typically 17 to 20 inches in diameter, and the caster angle of front wheel 12 is approximately 58 degrees in the described embodiment. This angle has been found to provide a suitable compromise between low speed handling and high speed stability, although other angles may be used.

Frame 10 provides a rigid interconnection between the front and rear wheel assemblies and also provides support for a cyclist in a recumbant position. The frame 10 is attached in front to bracket 21 on sleeve member 20 which holds the front wheel for steering, as discussed above. Frame 10 is also attached to a rear assembly 24 which holds rear wheel 14. Assembly 24 includes post 26 which is securely mounted to frame 10, for example, by means of U-shaped brackets 27 and 29. Two frame members 28 and 30 extend from post 26 on each side of rear wheel 14 to provide a triangular fork structure for mounting the axle of wheel 14, similar to conventional bicycles. At the top of post 26, the crankshaft of a pedal and sprocket wheel assembly 32 is mounted in ballbearings housed within the top part of post section 26. Pedal assembly 32 includes two pedals 34 on which a cyclist places his or her feet for propelling the bicycle. One or more sprocket wheels 36 are attached to pedals 34. Rear wheel 24 is typically 27 inches in diameter and includes a conventional deraillear gear assembly 38. A sprocket wheel chain 40 connects sprocket wheel 36 with gear assembly 38 and provides for the transfer of power from pedal assembly 32 to rear wheel 14. The front sprocket to rear sprocket gear ratios would be in the range of 64–68 to 12 for maximum speed, and approximately 59 to 13 for general riding.

Figure 2:
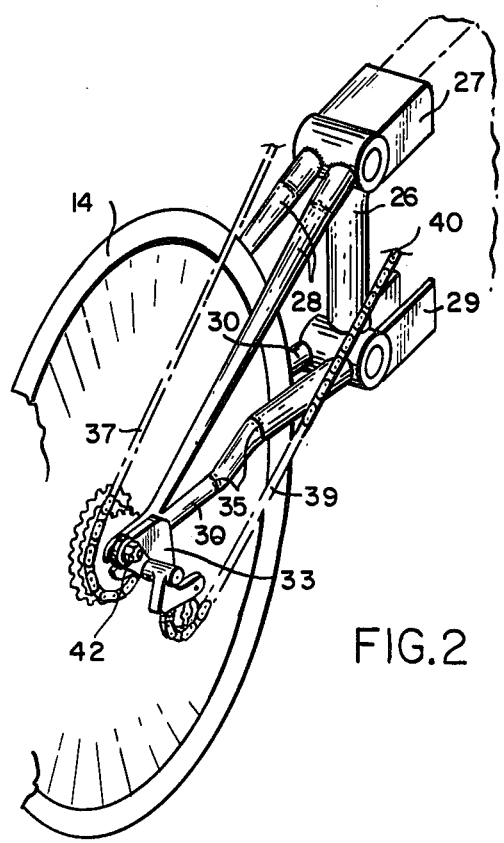
FIG. 2 shows details of the rear fork assembly.

Referring to FIG. 2, the structure of the rear wheel forks 24 is shown in more detail. Vertical post 26 is attached to frame 10 by means of upper and lower brackets 27 and 29. A hole 31 through the upper portion of post 26 is provided for mounting the crankshaft of the pedal assembly 32, not shown in FIG. 2. Two upper members 28 extend from the top of post 26 to an axle bracket 33 which receives the axle 42 of rear wheel 14. Two lower frame members 30 extend from the lower portion of post 26 to bracket 33.

The lower frame member 30 on the left hand side of the bicycle, opposite the side on which the chain and deraillear mechanism are located, is typically formed of a straight, tapered tubing section. The lower frame member 30 on the right hand or chain side of the bicycle, however, has two bends 35 provided therein to allow the lower portion of sprocket chain 40 to pass directly from pedal sprocket wheel 36 to the deraillear gears without the necessity of having the chain pass inside the frame member 30, as is the case with a typical drive arrangement on a conventional bicycle. This allows the chain to be removed from the bicycle without breaking the sprocket chain or removing the rear wheel.

Since pedals 32 are mounted at the top of post 26, in contrast with a conventional bicycle in which the pedals would be mounted at the bottom of the frame, the lower frame member 30 may be bent as shown at 35 to accommodate the lower chain path without impairing the structural integrity of the rear fork. This is because the lower frame member 30 is subject primarily to tension rather than to compressive stresses, which are present in the upper frame member 28. If such compressive stresses were present in the bent frame member 30, this frame member might tend to buckle at the points 35 where the bends occur.

In a conventional bicycle in which the pedals are on the bottom of the frame, chain path 27 would be the upper chain path and would lie inside the upper rear fork frame member, which is subjected to compressive stress. Thus, with the novel arrangement shown in FIGS. 1 and 2, the chain may be made to pass entirely outside the bicycle frame by bending the lower rear wheel fork member 30 which is not subject to tension stresses.

Returning to FIG. 1, a cyclist riding the cycle assumes a head-forward recumbant position on the bicycle, as shown. A support member 42 is provided on frame 10 to support the hips and pelvic area of the cyclist. The length of frame 10 would be chosen to be approximately 72 inches for a rider approximately 6 feet tall. When propelling the vehicle, the cyclist lies chest down on frame 10 and is supported by support member 42. The cyclist's feet are on pedals 34 while the cyclist's hands are positioned forward of the cyclist's head, grasping handle bars 22. When starting or stopping the bicycle, a cyclist may easily drop his or her legs from pedals 32 so that they touch the ground to provide support for the bicycle. As discussed in detail below, special provision is made in the cycle body to allow a cyclist to quickly and easily lower his or her legs to the ground to provide such stability.

Frame member 10 should be light and structurally strong. In the described embodiment, frame member 10 is constructed from plywood as a monocoque box and has angled bracing members 46 interior to the plywood box to provide additional stiffness. When such construction is used, the weight of the cycle, including frame 10 and front and rear wheel assemblies, but excluding body 50, may be kept to about 27 pounds or less. Other construction methods may be used for frame 10, including a frame constructed of thin-walled tubing, or a frame which is an integral part of the streamlined body such that the bicycle body becomes a part of the main stiffening structure.

The shape of the body 50 is most important in maintaining a low drag coefficient, and the particular design aspects of body 50 which are important in achieving this goal are discussed in detail below. The preferred embodiment described herein includes a pod-shaped body 50 which is rotationally symmetric about an axis 59 which is parallel to the direction of travel of the cycle. Extending from pod-shaped section 50 are a front wheel fairing 52 and a rear wheel fairing 54 which respectively surround and enclose the front and rear wheels.

One major effect on ground vehicles is the aerodynamic between road and vehicle. In research on smooth automobile bodies, it has been found that a separation of 50% of body width from the ground to the bottom of the body gives close to minimum drag. Additionally, it can be shown that at this separation a cross-section which is zero camber or axi-symmetric and parallel to the ground also gives close to minimum drag.

Figure 4:
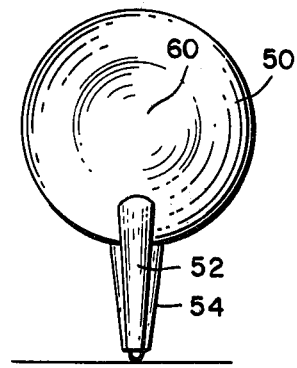
FIGS. 3 and 4 show further details of the cycle body.
Figure 3:
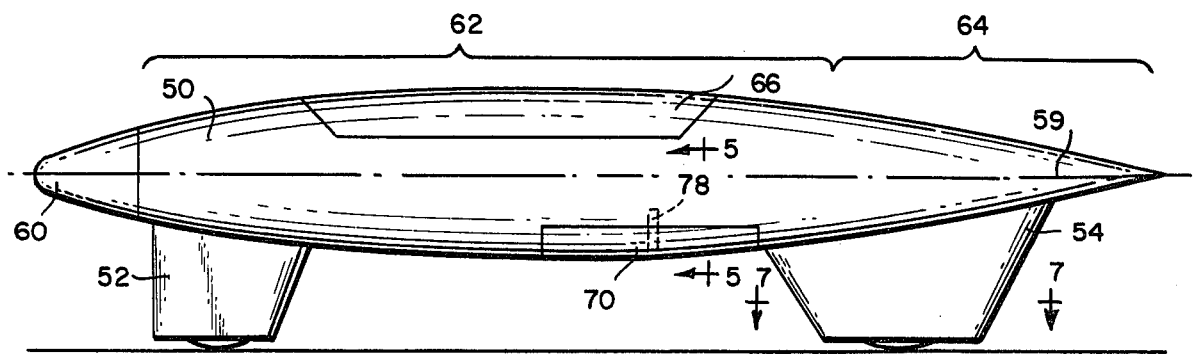

Referring to FIGS. 3 and 4, the low-drag body is shown in more detail. The main body section 50 has a narrow, rounded nose section 60 which extends in front of the cyclist and bicycle frame and wheels to provide low aerodynamic drag. For purposes of providing visibility, nose section 6o may be separately fabricated from a transparent material, such as plexiglass, to provide for forward vision of the cyclist. From nose section 60, the body smoothly expands until it is sufficiently wide through the middle section 62 thereof to contain the bicycle mechanism and cyclist, as shown in FIG. 1. In some parts of the cycle body, more room is required along one axis than in other parts of the cycle body, such as at the rider's horizontal shoulders and at the pedals, where the feet are required to move up and down. The circular cross section of body 50 accommodates these factors in a manner which minimizes their effect on aerodynamic drag, and, additionally, contributes to ease of fabrication. Providing sufficient room for the shoulders of the cyclist and for the rotary motion of pedals 32 requires that the middle section 62 have a maximum diameter on the order of two feet or so. Alternatively, the pedal assembly may be implemented by means of a linear crank assembly, which reduces the cross-sectional dimension required at the pedals.

From FIG. 3 it can be seen that the external configuration of middle section 62 is convex with respect to axis 59, and this shaping of middle section aids the maintenance of laminar flow over the body, resulting in a lower drag. The rear section 64 of the cycle body includes the rear-most 30 percent approximately and is concave with respect to axis 59, tapering to a point at the extreme rear of the bicycle body. The concave shape of rear section 64 minimizes surface area, and hence frictional drag, while maximizing pressure recovery of the air flow as it passes the rear section of the bicycle body, thereby mantaining laminar flow along the bicycle body for as much of the length of the body as possible.

In the present embodiment, the maximum diameter of the streamlined body is approximately 2 feet, and the length of the body is approximately 13⅓ feet. The body is typically fabricated of high elastic modulus fiberglass, although other materials, such as a honeycomb material, may also be used. A molded fiberglass body of sufficient strength for the cycle weighs about 20 pounds. If the surface of the cycle body is carefully prepared so as to be free of waves and other surface imperfections, and is finished by dry-sanding, for example, with number 400-600 carborundum paper, the body should be capable of maintaining laminar flow for up to 60 percent of the length of the body, thereby greatly minimizing drag. It should be appreciated, however, that other shapes which meet the criteria stated above, may be used for the cycle body.

The center top section 66 of the body is removable to allow the cyclist to enter the cycle body and to mount the cycle frame. Door 66 is preferably attached to body 50 by means of a hinge so that the door 66 may be easily lowered into place by a cyclist after the bicycle has been mounted. It is important that the juncture of door 66 and body 50 be as smooth and closely-fitting as possible to prevent disturbances to the laminar flow of air over the cycle body which could trigger turbulant flow.

Figure 5A:
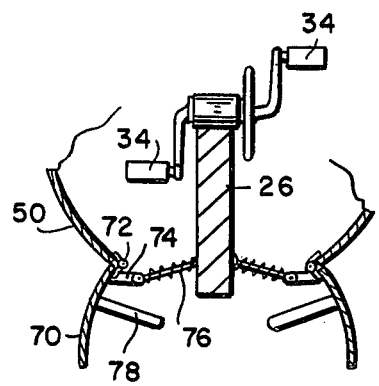
FIGS. 5a and 5b show details of the leg door mechanism.
Figure 5B:
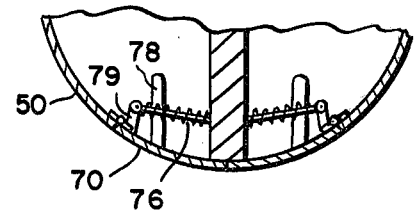

On the lower part of the body, under the legs of the cyclist, two doors 70 are provided on either side of the streamlined body so that a cyclist may lower his or her legs to the ground to provide low speed stability during starting and stopping maneuvers. These doors are shown in more detail in FIGS. 5a and 5b, which respectively show doors 70 in the open and closed positions. As shown in FIG. 5, doors 70 are formed as a continuation of body 50 and are attached thereto by means of hinges 72 or a similar connection running lengthwise along the streamline body. Posts 74 are connected to doors 70 adjacent to hinges 72 and extend upwardly therefrom. Compression springs 76 have one end thereof connected to frame member 10 and the other end connected to posts 74. Posts 74 and springs 76 are so positioned as to result in an over-center spring action which maintains doors 70 in either the open or the closed position. A lever 78 is attached to each door 70 midway along its length and is provided for closing door 70 when a cyclist returns his or her feet to pedals 32, as described below.

When stopped or travelling at slow speeds, a cyclist may lower his or her legs from the position shown in FIG. 1 until they touch the ground. In doing this, a part of the cyclist's foot or leg will contact door 70, pressing door 70 downwardly until it opens to allow the cyclist's foot to approach the ground. Once door 70 has been partially opened by a cyclist, the over-center action of post 74 and spring 76 serve to provide a force against door 70 which maintains it in a fully open position without further pressure from the cyclist's leg. After the cycle has gained sufficient speed, a cyclist will raise his or her leg to pedals 34. Lever 78 is so positioned that it is engaged by the back of the cyclist's leg and closes door 70 as the leg is raised to pedal 34. When door 70 is closed, lever 78 should be out of the way of the cyclist's legs as the cycle is pedaled. Once in the closed position, doors 70 are maintained firmly closed by the action of springs 76. In this manner, a cyclist's feet may be quickly and easily lowered to the ground while a streamlined body shape is maintained during those times that the cycle is being pedaled at other than low speeds.

Once the rider is enclosed in the streamlined body, providing ventilation is important, especially during long or high speed runs where adequate ventilation is necessary both to provide adequate oxygen to the cyclist and to prevent a cyclist from becoming overheated. A preferred method of providing ventilation is by means of one or more ducts 57 located on the side of the bicycle body. To reduce drag, a low drag NACA duct shape is preferred. Alternately a smooth, low-drag inlet in nose section 60 could be provided by making a circular opening in the nose, but such an inlet complicates the fabrication of the body and may interfere with the cyclist's forward vision.

Figure 6:
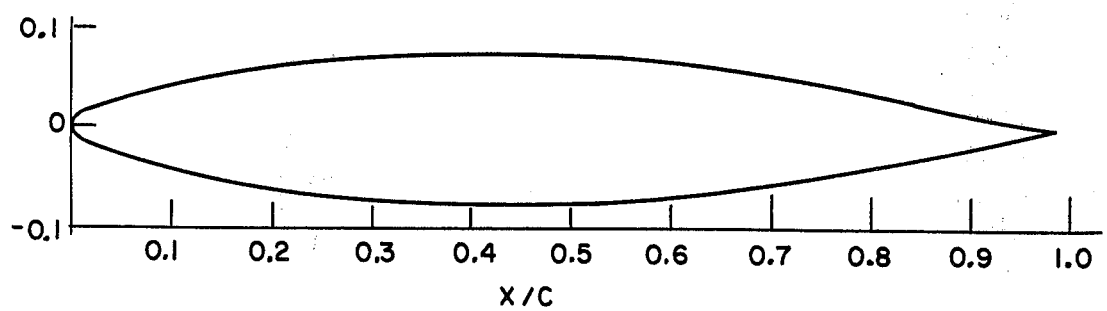
FIG. 6 is an outline showing a preferred body configuration.

FIG. 6 illustrates the preferred proportions for a low-drag body 50, and is in accordance with NACA air foil outline 66-015, as discussed below. Other similar configurations for body 50 may also be acceptable. While extensive research has been done on minimum drag shapes for air foils and similar three dimensional bodies, very little is known about minimum drag shapes for bodies of revolution. Although some work in this area has been done for glider fuselages, this work is not directly applicable to a streamlined bicycle design for several reasons. As discussed above, the air flow past a bicycle body is affected by the closeness of the ground surface on which the bicycle rides, which does not occur with gliders. Additionally, the juncture of the glider wings with the glider fuselage significantly affects and changes the aerodynamics of the fuselage.

It is known that, however, that for Reynolds numbers equivalent to a body having a length of approximately 10 feet and moving at about 50 to 60 mph, the minimum drag shape is a teardrop shape, which is concave over the rear 30 percent or so of length to minimize surface area and hence frictional drag while maximizing pressure recovery. In the present embodiment, a body shape has been selected which corresponds to a rotationally-symmetrical body having an outline given by NACA air foil cross-sectional forms, such as form 66-015 shown in FIG. 6, which gives dimensions for a 15 percent thick, laminar flow, air foil section. While these NACA sections have been optimized for use with air foils, which are not rotationally symmetric, such shapes are believed to provide the best compromise and trade-off between frontal area and drag for the following reason.

Experiments varying the maximum diameter to length (D/L) ratio of rotationally-symmetric bodies indicate minimum drag coefficients with D/L ratios of about 30 to 40 percent. As the D/L ratio decreases, the drag slowly increases. The preferred body shape described herein has a D/L ratio of about 15 percent, which is a practical compromise between drag coefficient and frontal area while providing adequate room for the rider and pedals within the body.

Figure 7:
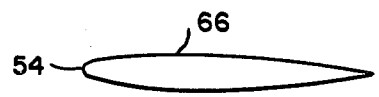
FIG. 7 is a sectional view of the rear wheel fairing.

Returning to FIGS. 3 and 4, the front and rear wheels each have fairings 52 and 54 surrounding them and extending from the streamlined body 50 to within a very small distance of the ground. Wheel fairings 52 and 54 are of an elongated teardrop shape in horizontal section. This is shown in FIG. 7 which shows a typical shape for rear wheel fairing 54 taken along section line 6—6 in FIG. 3. Front wheel fairing 52 has a similar shape. The wheels may be conventional, spoked bicycle wheels with solid or pneumatic tires. To reduce drag and turbulence within the wheel fairings, however, the spokes may be fitted with a smooth covering, or the wheels may be fabricated as solid discs.

As can be seen from FIG. 4, the front and rear wheel fairings taper from a lesser width close to the ground to a greater width where the fairings are attached to streamlined body 50. Although not shown in FIGS. 3 and 4, the juncture between the streamlined body and the wheel fairings may be faired to aid laminar flow and to decrease the tendency of the air flow to become turbulant at this juncture. Wheel fairings 52 and 54 should extend as closely as possible towards the ground. The optium ground clearance for the wheel fairings may vary, depending upon the use expected. For example, in a bicycle which is attempting to achieve extremely high speeds and for which the ability to make sharp turns is not so important, the wheel fairings might extend to within one-quarter inch of the ground. For a bicycle having a more varied use, the ground clearance may be made greater to allow for greater leaning of the bicycle during turns.

The rear wheel fairing 54 is permanently attached to the streamlined body 50. Front fairing may be made wider than rear fairing 54 to allow the front wheel to be pivoted with the fairing as the bicycle is steered. It is preferable, however, to pivotably attach front fairing 52 to the bicycle body so that it may turn with the front wheel 12 as the bicycle is steered. This allows the use of a much narrower front fairing and significantly reduces aerodynamic drag. As shown in FIG. 4, in the preferred embodiment, front fairing 52 is narrower than rear fairing 54, the rear fairing having to be wider to accommodate sprocket chain 40 and deraillear mechanism 38. In the preferred embodiment, the front wheel fairing has a horizontal section in the shape of NACA air foil thickness form 66-010 at the fairing bottom which changes in a parallel taper to a horizontal section equivalent to NACA form 66-025 over the front wheel axle. For the rear wheel fairing, a NACA form 66-010 at the bottom of the fairing is smoothly tapered to NACA form 66-020 over the rear wheel axle.

There has been described a new, streamlined bicycle including a novel frame and low-drag body which cooperate to provide the above-described numerous advantages over previous bicycle designs. It should be appreciated that modifications to the preferred embodiment described herein may be made by those or ordinary skill in implementing the teachings of the present invention. Accordingly, the description herein of a preferred embodiment should not be construed as a limitation upon the present invention. Rather, the invention should be interpreted in accordance with the appended claims.

I claim:

1. A streamlined, two-wheeled bicycle, comprising:
   a steerable front wheel assembly including a front wheel;
   a rear wheel assembly including a rear wheel;
   an elongated frame having a front end to which is connected the front wheel assembly and having a rear end to which is connected the rear wheel assembly;
   the frame including means for supporting a rider in a head-forward, recumbent position over the frame;
   a pedal assembly located at the rear portion of the frame so that the pedals are engaged by the feet or the rider when in said recumbent position;
   means for transmitting power from the pedal assembly to the rear wheel assembly to propel the bicycle;
   an elongated pod-shaped, streamlined body attached to the frame and substantially completely enclosing the frame, the pedal assembly and a rider when the rider is in said recumbent position wherein the pod-shaped body is substantially symmetrical about an axis parallel to the direction of movement of the cycle;
   the body further having a front section which smoothly expands in diameter, smoothly joining with a middle section which is convex with respect to said axis, and a rear section which is concave with respect to said axis and which tapers substantially to a pointed end;
   the body having a maximum diameter of D and being mounted to the frame such that the distance from the ground to said axis is approximately D and wherein the maximum diameter D of the body is approximately 15 percent of the total length of the body;
   a front wheel fairing attached to the body and substantially enclosing the front wheel in combination with the body;
   a rear wheel fairing attached to the body and substantially enclosing the rear wheel in combination with the body;
   the front and rear wheel fairings being separate such that an open space beneath the body and between the front and rear wheel fairings is provided; and
   wherein each of the front and wheel fairings are shaped so that horizontal sections thereof are in the form of an elongated, teardrop shape.

2. The cycle of claim 1 wherein the body has a shape which provides laminar flow along approximately 60 percent of the length of the body.

3. The cycle of claims 1 wherein the streamlined body further includes:
   door means, located on underside of the body beneath the legs of a rider in said recumbant position, for opening to allow the rider to place one or both feet on the ground and for closing when the rider has both feet on the pedals to provide a streamlined body shape.

4. The cycle of claim 3 wherein the door means includes two elongate sections of the underside of the body symmetrically located about the center line of the body and hinged at the outer side of each section so as to swing outwardly from the body; and
   spring means cooperative with each of the doors so as to provide a force to positively hold the doors in one of the open and closed positions.

5. The cycle of claim 1 further including:
   means for pivotably mounting the front fairing to the body so that the front fairing pivots as the front wheel is steered; and
   means for fixedly attaching the rear fairing to the body.

6. The cycle of claim 1 wherein the maximum diameter of the body is approximately two feet.

7. The cycle of claim 1 wherein the front wheel is smaller than the rear wheel.

8. The cycle of claim 1 wherein the front wheel is smaller than the rear wheel, the front wheel being small enough that it lies entirely outside the streamlined body, and the rear wheel being large enough that it extends into the streamlined body.

9. The cycle of claim 1 wherein the rear wheel assembly includes a triangular rear wheel fork assembly comprising:
   a vertical member;
   two lower members respectively extending from the bottom end of the vertical member to the axle of the rear wheel on each side of the rear wheel;
   two upper members respectively extending from the top of the vertical member to the rear wheel axle on each side of the wheel;
   the vertical member having means at the top end thereof for mounting the crank shaft of the pedal assembly so that the sprocket wheel is on one side thereof; and
   the lower member on the sprocket wheel side of the vertical member having a bend therein to allow a sprocket wheel chain to be run from the pedal sprocket wheel to the rear wheel gear assembly, the chain line running completely outside said members of the rear wheel assembly so that the sprocket chain may be removed without the necessity of breaking said chain or removing the rear wheel from the rear wheel assembly.

* * * * *